Sept. 15, 1953 R. A. MAHER ET AL 2,652,491

COLOR PULSE SELECTOR CIRCUIT

Filed March 17, 1951 2 Sheets-Sheet 1

INVENTORS.
RICHARD A. MAHER.
CHRISTIAN C. PFITZER.
BY
Alden D. Redfield
ATTORNEY.

COLOR PULSE SELECTOR CIRCUIT

Filed March 17, 1951 2 Sheets-Sheet 2

INVENTORS.
RICHARD A. MAHER.
CHRISTIAN C. PFITZER.
BY
Alden D. Redfield
ATTORNEY.

Patented Sept. 15, 1953 2,652,491

UNITED STATES PATENT OFFICE 2,652,491

COLOR PULSE SELECTOR CIRCUIT

Richard A. Maher and Christian C. Pfitzer, Cincinnati, Ohio, assignors to Avco Manufacturing Corporation, Cincinnati, Ohio, a corporation of Delaware Application March 17, 1951, Serial No. 216,142

3 Claims. (Cl. 250—27)

Figure 1:
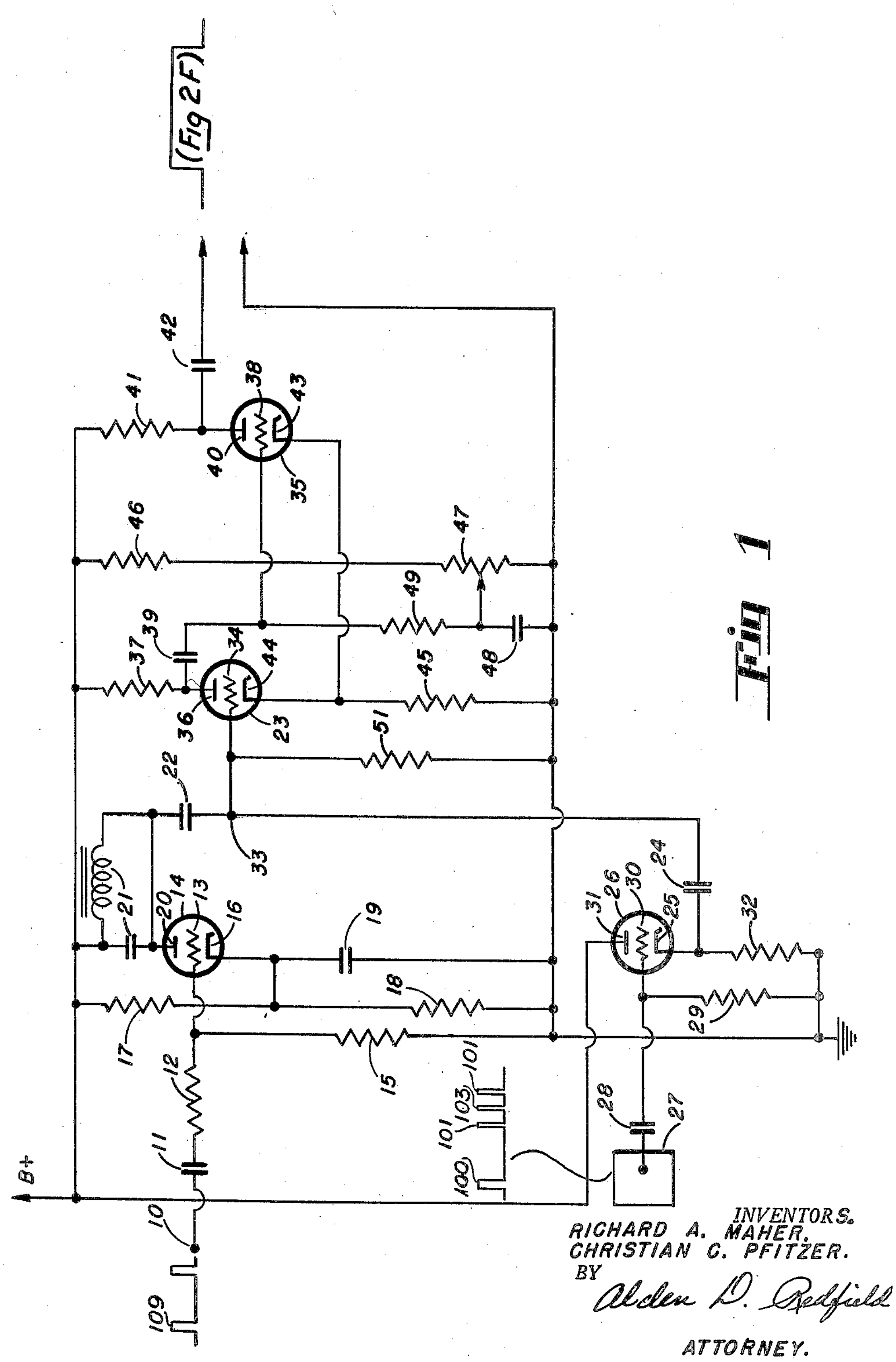
Figure 7:
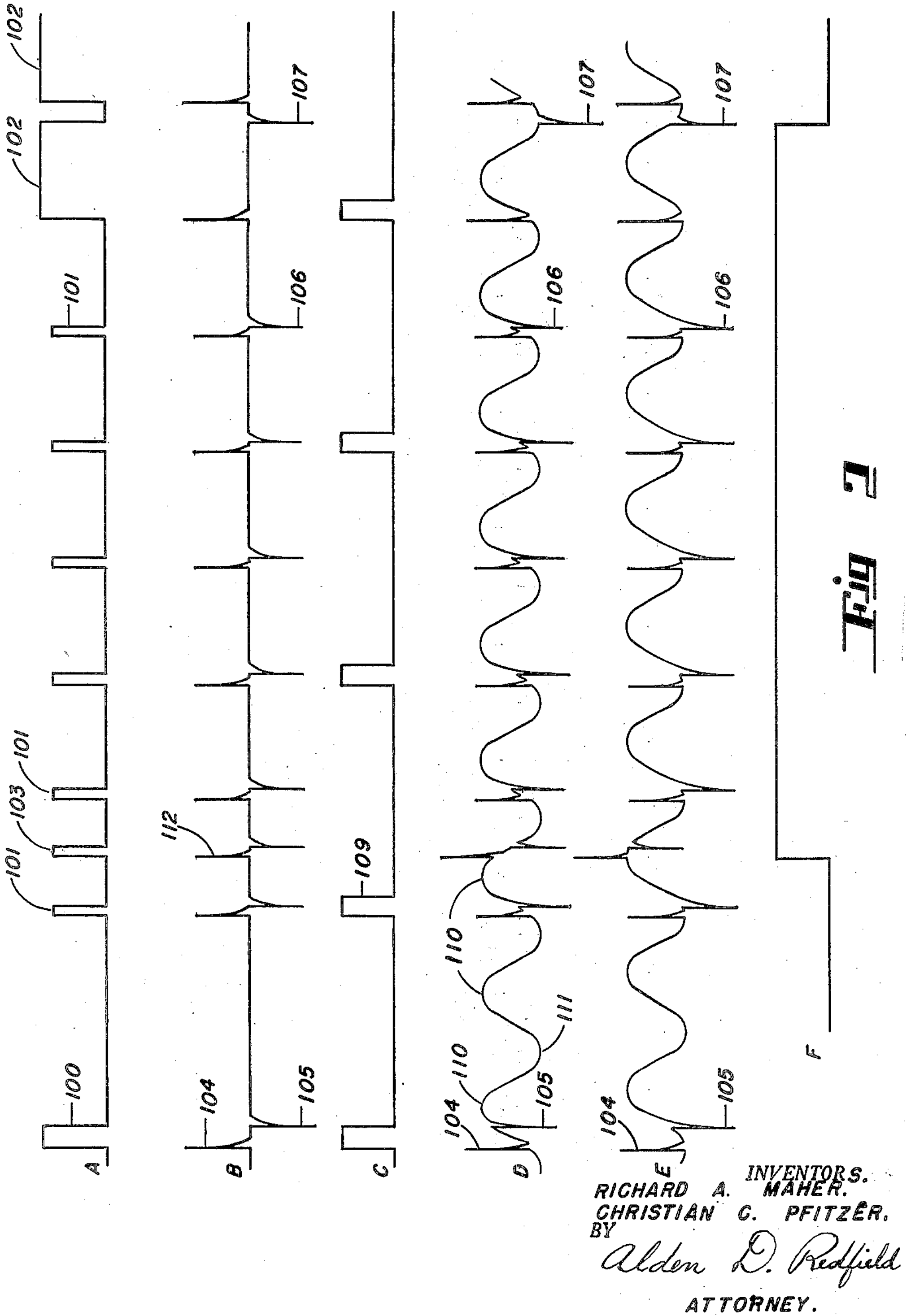

This invention relates in general to pulse selector circuits and more specifically to a pulse selector circuit which may be used advantageously in a color television receiver capable of receiving field sequential type signals. Signals of this type are produced when the object field is scanned, at the transmitter camera, successively with an even field of one color, an odd field of a second color, an even field of the third color, an odd field of the first color, and so on until an even and an odd field for each color has been scanned so as to make up a complete color frame.

At present, satisfactory operation of a field sequential type color television receiver requires the use of a mechanically driven color filter wheel, wherein the position of each filter segment is maintained in a fixed time phase relationship with each transmitted color field. However, it is not unlikely that a successful tri-colored tube will be developed and used to eliminate the need for a mechanical color filter, at least on receivers. Regardless of the method used to place color on the kinescope screen, some type of color sync pulse has to be used in order that satisfactory results will obtain.

In this regard, along with the proposed field sequential system of color television, it has been authorized by FCC order that an extra equalizing pulse be inserted into the composite signal for indicating the relative time phase position of a given color field, viz., the red field. Such a pulse has advantages from the viewpoint of signal space presently available because an equalizing pulse has such a short duration and can be neatly fit into the authorized signal without any changes in other sync pulse relationships. However, from the viewpoint of receiver design, separation of such a narrow pulse for use, presents a task somewhat analogous to the task of plucking a needle from the proverbial hay stack at the rate of forty-eight times a second.

Other inventors have solved pulse selection problems through the use of delay lines or delay expedients in conjunction with a phase discriminator circuit. However, circuits of this type can only be used in a relatively noise free environment and it is seldom economically feasible, even if possible, to establish such a condition in a commercial television receiver circuit. Thus much work has been done with a view to producing a pulse selector circuit which will give satisfactory results even though the signal from which the pulse is to be selected inherently includes a considerable amount of noise. Other circuits, some of which are presently used to separate vertical synchronizing pulses from the horizontal synchronizing pulses, depend for their operation on a difference in pulse energy content. Still other circuits are based on an amplitude discrimination principle. These last two principles are often combined to produce circuits which discriminate between pulses of varying duration by using the given pulses to generate other pulses having a varying amplitude. Also, circuits have been developed which convert pulses of varying amplitude into pulses of varying duration. Each one of these principles of pulse selection has its own peculiar advantages, producing excellent results in the proper environment. It seems, however, that each and every one of these circuits suffers from some debility which makes it inadequate for selecting a color field indication pulse having a duration similar if not identical to an equalizing pulse.

Therefore, it becomes a general object of this invention to provide an efficient and practical pulse selector circuit.

It is also a general object of this invention to provide a pulse selector circuit capable of discriminating against all pulses other than those having a leading edge in a given time phase position relative to the leading edges of pulses to be discriminated against.

It is also a basic object of this invention to produce a pulse selector circuit capable of separating in a relatively noisy environment and capable of detecting and effectively extracting one pulse out of a train of similarly shaped pulses.

It is a further basic object of this invention to provide a pulse selector circuit capable of producing an output pulse of fixed duration in synchronism with the leading edge of a pulse to be distinguished by its phase displacement relative to undesired pulses.

It is a more specific object of this invention to produce a pulse selector circuit capable of selecting a color field indicating pulse, without depending upon either the duration or amplitude of the selected pulse but rather upon the relative time phase position of the selected pulse.

For a better understanding of our invention, together with other and further objects, advantages and capabilities thereof, reference is made to the following description and appended claims in connection with the accompanying drawings, in which:

Fig. 1 is a schematic diagram of a specific embodiment of the pulse selector circuit, and Fig. 2 is a set of curves used to explain operation of the circuit of Fig. 1.

In practicing our invention we provide a source of pulses each of which are in synchronism with or derived directly from a selected portion of the horizontal sync pulses. In the specific embodiment shown, this source of pulses is taken from the horizontal deflection transformer, each pulse being in sync with horizontal retrace. A second source of pulses comprising stripped sync pulses, including horizontal, vertical and color sync pulses, along with equalizing pulses, is taken from the output of a conventional sync separator circuit. The horizontal retrace pulses from the first mentioned source, are used to shock excite a tuned circuit which may be adjusted to oscillate at a frequency slightly higher than double the pulse repetition frequency of the driving horizontal retrace pulses. The stripped sync pulses, equalizing pulses and included color pulses are effectively differentiated in an R-C circuit or its equivalent and then added to the output wave produced by the above-mentioned shock excited circuit. It should be noted that the output wave from the shock excited circuit will not be a pure sine wave. Quite to the contrary, the output wave is slightly distorted because of the particular relationship selected between the resonant frequency of the shock excited circuit and the pulse repetition frequency of the shock exciting pulses or horizontal retrace pulses. As a result, when the differentiated pulses are combined with the wave produced in the shock excited circuit, the differentiated leading edge of the color pulse combines with a peak of the voltage wave to produce a relatively high signal peak with sufficient amplitude to be passed through a threshold biased amplitude discriminating circuit. Also, the trailing edges of the vertical sync pulse serrations, because of the particular tuned circuit frequency selected, when differentiated and combined with the oscillatory wave, produce negative going peaks of higher amplitude, than the trailing edges of either the horizontal sync pulses or the equalizing pulses. Then, by selecting a pulse generator which is adapted to be first activated by high pulses of one polarity, and then deactivated by high pulses of the opposite polarity, we are able to produce an output pulse having a fixed duration, with the leading edge in phase coincidence with the leading edge of the color pulse and the trailing edge in phase coincidence with the trailing edge of the first vertical sync pulse serration. The combined circuit then is capable of producing a pulse of fixed duration and time phase relation with each color pulse, discriminating against all other sync pulses, equalizing pulses and noise pulses.

In order to explain the details of a typical circuit which embodies our invention, we have shown in Fig. 1A, terminal 10 which is connected to a source of horizontal retrace pulses, or more broadly speaking, a source of pulses derived from the horizontal sync pulses. These pulses are coupled through capacitor 11 and resistor 12 to grid 13 of wave generator tube 14. Resistor 15 is connected between grid 13 and ground, thereby acting as a grid leak resistor for coupling capacitor 11. Cathode 16 is connected through a fixed bias source, comprising resistor divider 17—18 and capacitor 19, to ground. Anode 20 is connected through tuned circuit 21 to a source of plate potential B+, not shown. The output of tuned circuit 21 is coupled through capacitor 22 to the grid of threshold biased tube 23 and through capacitor 24 to the cathode 25 of amplifier 26 as well as to the grid 34 of tube 23.

Sync separator 27 is coupled through a differentiator circuit, comprising capacitor 28 and resistor 29, to grid 30 of tube 26 whose anode 31 is coupled to a source of plate potential B+, not shown. The output from cathode follower 26 is taken across cathode resistor 32 and added in series with the voltage across condensor 24 and the sum of these two voltages presented to terminal 33. Terminal 33 is connected to grid 34 of threshold biased tube 23 which, along with tube 35, forms a "single-shot" or uni-stable multivibrator. Anode 36 of tube 23 is connected to the plate supply voltage through resistor 37 and is coupled to grid 38 of tube 35 through coupling capacitor 39. Plate 40 of tube 35 is connected through resistor 41 to the source of plate potential and is coupled to an output terminal through coupling capacitor 42. Cathode 43 of tube 35 and cathode 44 of tube 23 are both coupled through resistor 45 to ground. A voltage divider comprising resistors 46 and potentiometer 47 is connected between the source of plate potential and ground to supply a bias across by-pass capacitor 48 which is coupled through resistor 49 to grid 38 of tube 35. Ground functions as the second output terminal.

Considering now the manner in which the above described circuit operates, it will become apparent that a certain fixed relationship must exist between the pulses used to shock excite the tuned circuit 21 and the pulses taken from sync separator 27. In the specific embodiment herein disclosed, horizontal retrace pulses, shown in idealized form in Fig. 2C, taken from the horizontal deflection circuit substantially in phase with the horizontal sync pulses, were used to shock excite tuned circuit 21. In circuits where the horizontal retrace pulses phase lag the horizontal sync pulses, such as pulse 100, of Fig. 2A, it may be necessary to adjust the frequency to which the circuit 21 is tuned in order to place the negative peak of each shock excited wave in phase coincidence with the leading edge of the horizontal sync pulse. In those cases where the horizontal retrace pulses phase lag the horizontal sync pulses by a considerable time period, it may be necessary to insert a delay line or delay means between the source of retrace pulses and the shock excited circuit in order to make each delayed retrace pulse occur in time synchronism with the following horizontal sync pulse. Other and more obvious expedients will occur to those skilled in the art. However, it seems advisable to use a source of pulses derived from or generated in sync with the horizontal retrace pulses in order to pick up as much noise immunity as possible.

Referring again to the pulses shown in Fig. 2A it will be seen that the equalizing pulses 101 and vertical sync pulses 102 can be defined as a "first group of pulses, the leading edges of which occur intermittently at a given pulse repetition rate." Also, it should be noted that the equalizing pulses 101 constitute a portion of the first group of pulses which have shorter duration and less amplitude than the other pulses of said first group, or the vertical sync pulses. Further, color pulses 103 can be defined as a second group of pulses, said pulses being the ones which are desired to be selected. Also note that each pulse of this second group of pulses has a leading edge which is time spaced equally between the leading edges of two adjacent equalizing pulses. Before considering the action of the R-C differentiating circuit 28, 29 on the pulses of Fig. 2A it should be mentioned that the difference in amplitude between the short duration equalizing pulses and color pulses, and the long duration vertical pulses arises from the fact that the tubes in sync separator circuit 27 were not completely compensated to take care of "Miller effect." As a result, the dynamic input capacitance of these tubes acted to decrease the amplitude of the narrow equalizing pulses and color pulses with respect to the longer duration vertical pulses. This effect is not absolutely necessary to successful circuit operation. However, if an output pulse of fixed duration is desired, we have found that the resulting peak to peak difference between the differentiated versions of these pulses helps to stabilize circuit operation. It is worthy of again stating, however, that the circuit will operate very efficiently without this difference in pulse amplitude.

Though an exhaustive explanation of differentiator circuit operation is not deemed necessary, in view of the fact that such circuits are well established and well known to those skilled in the art, a brief explanation is warranted here. As is well known, the impedance offered by a capacitor is inversely proportional to the frequency of the signal impressed across its terminals. Whether the horizontal sync pulse 100 is considered as a group of sine waves under the "Fourier theorem" or whether the leading edge is considered as a very rapidly rising voltage in its own right, capacitor 28 offers little if any impedance to this leading edge and practically the total voltage is impressed across resistor 29. However, due to the short charging time of capacitor 28, shortly after the leading edge reaches its peak position, the capacitor becomes fully charged to the peak voltage, having such a polarity as to make grid 30 negative with respect to the output terminal of sync separator 27. It can be seen, at this point in time, that the charge across capacitor 28 then represents a voltage equal and opposite to the sync pulse voltage impressed across the output of sync separator 27, with the result that little if any voltage is impressed across resistor 29. So, at first, resistor 29 has substantially the full peak voltage of the input pulse impressed across it and at the next instant, there is little if any voltage across the resistor. Pulse 104 of Fig. 2B shows the resultant voltage impressed across the input to tube 26. When the trailing edge of pulse 100, Fig. 2A, is impressed across the differentiating circuit a similar action results, though of opposite polarity. Pulse 105 of Fig. 2B indicates an idealized version of the wave form impressed across the input of tube 26 by the trailing edge of pulse 100. The action of the differentiating circuit on the equalizing pulses and the vertical sync pulses now becomes apparent. Since the equalizing pulses have less amplitude than the vertical sync pulses and since the leading and trailing edges of these pulses have substantially the same rate of change, the higher vertical sync pulses produce a larger peak to peak differentiated wave than do the relatively shorter equalizing pulses. Cathode follower 26 is used to impress the differentiated form of these pulses, shown in Fig. 2B, across cathode resistor 32. The voltage across resistor 32 and the voltage across capacitor 24 are then added relative to ground to impress a combined signal across the input of threshold biased tube 34. The manner in which the voltage across capacitor 24 is derived will now be explained.

As was stated above, terminal 10 is connected to a source of pulses which are substantially in phase coincidence with the horizontal sync pulses. Also, as previously mentioned, in our particular embodiment we elected to use horizontal retrace pulses taken from the horizontal deflection circuit, not only because these pulses continued during the vertical synchronizing period but primarily because they were fairly free of noise. Of course, any similarly derived pulse might be used. It can be seen that the leading edge of each positive going horizontal retrace pulse drives amplifier 14 into a conducting condition to thereby shock excite tuned circuit 21 into oscillation. Since plate 20 goes negative relative to ground, at this point in time, the negative peak of the output oscillatory wave is started in time phase coincidence with the leading edge of the driving pulse, which, as has been stated, is a horizontal retrace pulse in this specific embodiment. To repeat, we prefer to adjust the tuned circuit 21 to oscillate at a frequency which is slightly faster than double the pulse repetition frequency of the driving pulses. As far as pulse selecting action alone is concerned, circuit 21 may be tuned to resonate at exactly twice the pulse repetition frequency of the driving pulses. The advantageous result to be realized, which makes it desirable to adjust tuned circuit 21 slightly faster than this frequency is related solely to termination of the pulse selector output signal, as will hereinafter become apparent. However, even though tuned circuit 21 is adjusted to a slightly higher frequency than the driving pulse repetition frequency, it is to be noted that the generated wave is in fact locked to and in sync with the repetition frequency of the driving pulses. This can be seen by referring to Fig. 2D where the negative peak of every other oscillatory wave is shown in phase coincidence with a leading edge of one of the driving pulses. After starting, the wave then goes through a little more than two complete cycles before the next driving pulse 109 forces tube 14 to conduct. At this point there appears a slight discontinuity in the oscillatory wave because the leading edge of the driving pulse again brings plate 20 to its most negative point, relative to ground. In those cases where tuned circuit 21 is adjusted to resonate at exactly twice the repetition frequency of the driving pulses, this discontinuity will not appear and the output wave will be effectively a pure sine wave, as shown in Fig. 2E, rather than a distorted sine wave. Comparing the two previously mentioned possible adjustments of tuned circuit 21, it can be seen that the first two positive peaks 110 and the center negative peak 111 will be slightly phase advanced, in the preferred case where the tuned circuit is adjusted to oscillate slightly faster than the repetition frequency of the driving pulses, from what they would be if the tuned circuit were adjusted to operate at exactly twice the frequency of the driving pulses. This small phase advancement allows the circuit to discriminate in favor of differentiated pulse 107 of Fig. 2B, as will be explained.

Now considering the adding action of the circuit, it can be seen that the oscillatory wave is coupled through capacitor 22 to the terminal 33 side of capacitor 24. Capacitor 24 and resistance 32 are selected to have a very short time constant whereby the voltage across capacitor 24 essentially follows the oscillatory wave form. Since the oscillatory wave charges this capacitor so as to make the capacitor plate of capacitor 24, which is connected to terminal 33, have the same polarity relative to ground as does anode 20 of tube 14, the voltages across resistor 32 and capacitor 24 are effectively added and impressed across grid 34 of tube 23. It now becomes apparent that the circuit of capacitor 24 and resistance 32 can be defined as means connected to said differentiating means and said generating means for combining the differentiated pulses in additive relation with said sine wave voltage.

As was mentioned above, tubes 23 and 35 are connected to form a uni-stable multivibrator circuit. Tube 35 is normally maintained in a conductive condition by a positive bias tapped off of resistor divider 46—47 and placed on grid 38 through resistance 49. Plate conduction through tube 35 establishes a drop across cathode resistor 45, raising cathode 44 of tube 23 to a potential which is sufficient to maintain this tube at cut-off, so long as the voltage on grid 34 is not raised sufficiently above ground by conduction through its grid leak resistor 51. Therefore it can be seen that we have provided, in the circuit of tubes 23 and 40, an apparatus which can be defined as a "threshold biased pulse producing means having an input connected to said combining means."

To show how this threshold biased multivibrator functions to select the color pulse, reference is again made to the curves of Fig. 2. In Fig. 2D there is shown the signal which results when a positive oscillatory peak is combined with the differentiated leading edge 112 of the color pulse, shown in Fig. 2B. As can be seen, a very high positive peak, relative to the remainder of the signal, results when these particular signals are combined. It will also be noted that the leading and trailing edges of all other pulses coincide with various portions of negative oscillatory wave peaks. The lone high positive peak drives tube 23 into conduction, dropping the voltage on anode 36, and placing a negative pulse on grid 38 of tube 35 via capacitor 39. The increased current flow from tube 23 through resistance 45 tends to raise the potential on cathode 43, also tending to cut-off tube 35. The combined effect causes uni-stable multivibrator to rapidly change over into its unstable condition, where tube 23 is conducting and tube 35 is cut-off. This unstable state is maintained so long as the discharge through tube 23 and resistor 49 of capacitor 39 continues to hold grid 38 of tube 35 sufficiently negative with respect to cathode 43. Though this time constant is not critical, it must be selected to be longer than the duration of the desired output pulse.

We will now explain how the previously mentioned large peak to peak voltage of differentiated pulse 107, as compared with the smaller peak to peak voltage of differentiated pulse 106, can be used to advantage. Also we will now explain why there is an advantage in adjusting the tuned circuit 21 to operate at a frequency slightly faster than twice the repetition frequency of the driving pulses, or horizontal retrace pulses. First it should be mentioned that there is very little difference between the duration of an equalizing pulse and the duration of the serrations in the vertical synchronizing pulse. If the oscillatory wave were adjusted to oscillate at twice the frequency of the horizontal retrace pulses and, assuming that the horizontal retrace pulses were exactly in sync with the horizontal sync pulses, then the leading edge of each equalizing pulse and the positive going edge of each vertical sync serration would fall exactly upon the negative peak of the oscillatory wave. However the trailing edge of each equalizing pulse when differentiated and combined with an undistorted oscillatory wave would lag these negative peaks by approximately .04 of a line period. In other words, looking at the curves of Fig. 2E, which shows a sine wave as would be generated in tuned circuit 21 if it were adjusted to resonate at exactly twice the pulse repetition frequency of the driving pulses, it can be seen that each negative trailing edge of an equalizing pulse inherently falls to the right of the negative peak of the oscillatory wave. Quite to the contrary the differentiated trailing edge of the first vertical sync pulse serration, viz., differentiated pulse 107 of Fig. 2B inherently falls to the left of the vertical peak when an undistorted sine wave is used. Now note, referring to Fig. 2D, by using an oscillatory wave having a frequency which is slightly faster than twice the frequency of the driving pulses, that every other negative peak is slightly phase advanced, relative to what would have been its position in time if it had been an undistorted sine wave as shown in Fig. 2E. Therefore the adjustment of the tuned circuit favors differentiated pulse 107 because it is phase leading the negative peak of the undistorted sine wave of Fig. 2E and discriminates against trailing edges similar to pulses 105 and 106 because they phase lag the negative peaks of the undistorted sine wave of Fig. 2E. In other words, we found that when the tuned circuit 21 is adjusted to produce an undistorted sine wave of twice the frequency of the driving pulses, that the trailing edges of the horizontal sync pulses and the equalizing pulses fell to the right of the negative wave peaks, on the time axis, and the trailing edges of the vertical sync pulse serrations inherently fell to the left of the negative wave peaks on the time axis. Using this relationship, we discovered that by slightly distorting the oscillatory wave we could place the trailing edges of the vertical serrations on top of the negative wave peaks and at the same time discriminate against the trailing edges of all other waves by placing them on a more positive portion of the oscillatory wave. Therefore, the trailing edges of the vertical sync pulse serrations, when combined with the output of a circuit tuned to a slightly higher frequency than the driving pulses, drive further negative than any other combined wave portions for two reasons, viz., (1) the differentiated versions of these trailing edges have a larger peak to peak voltage than the differentiated peaks of any other pulses because the narrow horizontal sync pulses and equalizing pulses are effectively limited in sync separator 27, due to a partially uncompensated "Miller effect," (2) and because the oscillatory wave is distorted to phase advance the negative wave peaks to discriminate in favor of the trailing edges of the serrated vertical sync pulses and against the trailing edges of all other pulses.

Continuing the explanation of multivibrator action, it can be seen that negative pulse 107 of Fig. 2D is the first strong negative pulse impressed upon grid 34 of the tube 23 which was driven into conduction by the color pulse. Assuming that the time constant of capacitor 39 and resistor 49 plus part of resistor 47 is set within reasonable limits, this high negative pulse cuts off current flow through tube 23 and drives tube 35 into substantially instantaneous conduction by multivibrator action. The output pulse of Fig. 2F is taken off between plate 40 and ground and coupled through a capacitor 42 to one output terminal making ground the second output terminal. Thus it will be seen that we have provided "means for generating the leading edge of an output pulse in phase coincidence with the highest positive peak of said combined signals and for generating the trailing edge of said output pulse in time phase coincidence with the first large negative peak next following the said highest positive peak of said combined signal."

It now becomes apparent that we have provided a pulse selector circuit capable of recognizing a desired pulse having a fixed time phase position relative to undesired pulses. It also becomes apparent that actual selector operation does not depend upon the difference in pulse energy content between the desired and undesired pulses. It is worthy of note that our selector is capable of operating in a relatively noisy environment because of the sharp circuit selectivity which results from the particular wave forms selected for combining prior to ultimate amplitude discrimination.

If desired, in those cases where tuned circuit 21 is adjusted to take advantage of the relative phase position of the trailing edge of the first vertical sync pulse serration to produce a fixed duration output pulse, as it is in our preferred embodiment, the vertical sync pulse generator can also be driven by the signal appearing on grid 34 of tube 23. This would eliminate the need for other vertical inter-sync separator circuits.

It might also be mentioned that our novel pulse selector can be used to distinguish between black and white composite sync pulse information and color composite sync information to automatically energize a color "slave" unit.

Though circuit operation has been explained with relation to only one vertical sync pulse period it should be realized, after reading the above disclosure that a color field indicating pulse can be selected from either an "odd field" or an "even field" or both fields, because the basic time phase relationships among the desired and undesired pulses are maintained in both periods. Therefore in those fields where the first equalizing pulse is only one-half of a line period from the last horizontal sync pulse, the color pulse which is placed between two adjacent equalizing pulses still has a leading edge which will coincide with a positive peak of the oscillatory wave produced in tuned circuit 21 and thus be passed by the threshold biased amplitude discriminator or multivibrator as shown in the illustrated embodiment.

Thus it will be seen that we have provided a pulse selector circuit combination comprising a first group of pulses the leading edges of which occur intermittently at a given pulse repetition rate (equalizing pulses and vertical pulses), a portion of said pulses (the equalizing pulses) having shorter duration and less amplitude than other (the vertical sync pulses) of said pulses, a second group of pulses, said pulses being the ones which are desired to be selected (color pulses), each pulse of the said second group of pulses having a leading edge time spaced between the leading edges of two adjacent pulses of said portion (equalizing pulses) of pulses, means (horizontal retrace pulses and tuned circuit 21) for generating a slightly distorted sine wave voltage having a frequency substantially identical to the pulse repetition frequency of the leading edges of said first group of pulses, having a peak of one polarity (negative in the illustrated embodiment) in time phase coincidence with the leading edge of the first of said two adjacent pulses, said leading edge having an opposite (positive in the illustrated embodiment) polarity going direction from said coincidence wave peak, said wave voltage also having a peak of said one (negative in the illustrated embodiment) polarity substantially in time phase coincidence with the trailing edge of at least one of said other (serrated vertical sync pulses) pulses, means (capacitor 28, resistor 29) connected to said pulse source 27 for effectively differentiating said first and second group of pulses, means 24, 32 for combining the differentiated pulses in additive relation with said sine wave voltage, threshold biased pulse producing means 23, 35 having an input connected to said combining means 24, 32 for commencing an output pulse in time phase coincidence with the signal resulting when the differentiating leading edges of said second group (color pulses) of pulses are added to the coinciding portion of said wave voltage and terminating said output pulse substantially in time phase coincidence with the signal resulting when one of the differentiated trailing edges of said other pulses (serrated vertical sync pulses) is added to the coinciding portion of said wave voltage.

While we do not desire to be limited to any specific parameters, such parameters varying in accordance with the requirements of individual designs, the following circuit values have been found to be entirely satisfactory in the specific and successful illustrated embodiment of the invention:

| | |
|---|---|
| Capacitors: | |
| 11 | 680 micromicrofarads |
| 19 | .1 microfarad |
| 22 | 22 micromicrofarads |
| 24 | 270 micromicrofarads |
| 28 | 50 micromicrofarads |
| 39 | 1180 micromicrofarads |
| 42, 48 | .1 microfarad |
| Resistors: | |
| 12 | 220,000 ohms |
| 15 | 47,000 ohms |
| 17 | 560,000 ohms |
| 18 | 56,000 ohms |
| 29 | 10,000 ohms |
| 32 | 68,000 ohms |
| 37 | 27,000 ohms |
| 41 | 15,000 ohms |
| 45 | 3,900 ohms |
| 46 | 390,000 ohms |
| 47 | 50,000 ohms |
| 49 | 560,000 ohms |
| 51 | 100,000 ohms |
| Tuned circuit 21: | |
| Inductor | 10 mh.±20% |
| Capacitor | 680 micromicrofarads |
| Tubes: 14, 23, 26, 35 | ½12AU7 |

While there has been shown and described what at present is considered the preferred embodiment of the present invention, it will now be obvious to those skilled in the art that various changes and modifications may be made therein without departing from the invention as defined in the appended claims.

We claim:

1. In a color television receiver the combination comprising a source of positive going undesired pulses having a given pulse repetition frequency, a portion of said undesired pulses being of shorter duration than others of said undesired pulses, and a positive going desired pulse having a leading edge equally spaced in time between the leading edges of two adjacent said shorter duration undesired pulses, means for generating a voltage of distorted sine wave form having a frequency equal to the pulse repetition frequency of said undesired pulses, the negative peaks of said waves being substantially in time phase coincidence with the leading edges of said undesired pulses and a negative peak of at least one of said waves being in time phase coincidence with the trailing edge of one of said undesired pulses of longer duration, means for differentiating said pulses, means for additively combining said wave and said differentiated pulses, threshold biased means connected to said combining means for generating the leading edge of an output pulse in phase coincidence with the highest positive peak of said combined signals and for generating the trailing edge of said output pulse in time phase coincidence with the first large negative peak next following the highest positive peak of said combined signal, whereby an output pulse of fixed duration is commenced in time phase coincidence with the leading edge of said desired pulse and terminated in time coincidence with the trailing edge of said undesired pulse.

2. In a color television receiver the combination comprising a source of first polarity going undesired pulses having a given pulse repetition frequency, a portion of said undesired pulses being of shorter duration than others of said undesired pulses and a first polarity going desired pulse having a leading edge equally time spaced between the leading edges of two adjacent said shorter duration undesired pulses, means for generating a voltage of distorted sine wave form having a frequency equal to the pulse repetition frequency of said undesired pulses with peaks of opposite polarity from said first polarity being in time phase coincidence with the leading edges of said undesired pulses and with at least one of said opposite polarity peaks being in time phase coincidence with the trailing edge of one of said undesired pulses of longer duration, means for differentiating said pulses, means for additively combining said wave and said differentiated pulses, threshold bias means connected to said combining means for generating the leading edge of an output pulse in phase coincidence with the highest peak of said combined signals of said first polarity and for generating the trailing edge of said output pulse in time phase coincidence with the first large peak of said opposite polarity next following the highest first polarity peak of said combined signal, whereby an output pulse of fixed duration is commenced in time phase coincidence with the leading edge of said desired pulse and terminated in time coincidence with the trailing edge of said undesired pulse.

3. In a pulse selector circuit the combination comprising a composite source of positive going pulses, said pulses comprising a first group of pulses occurring intermittently at a given pulse repetition rate, each pulse having the same time phase position it would have had if the pulse train were not intermittent, a second group of pulses occurring intermittently during portions of the periods when said first group of pulses are absent and having a repetition rate twice that of said first group of pulses, the leading edges of alternate pulses of said second pulse group occupying the same time phase position that the leading edges of said first group of pulses would have occupied had they been present, a third group of pulses, each pulse of the third pulse group having a leading edge spaced equally between the leading edges of two adjacent pulses of said second pulse group, a source of non-intermittent wave voltage having the same frequency as said second group of pulses with alternate negative peaks occurring in time phase with the leading edges of said first group of pulses, differentiating means having input terminals connected to said pulse source and having output terminals, means connected to said wave source and said differentiating means output for additively combining said wave voltage and the output from said differentiating means, and a threshold biased selecting means having an input connected to the output of said combining means for discriminating against all signals having an amplitude less than the highest positive amplitude of the combined signal.

RICHARD A. MAHER.
CHRISTIAN C. PFITZER.

References Cited in the file of this patent

UNITED STATES PATENTS

| Number | Name | Date |
|---|---|---|
| 2,408,079 | Labin et al. | Sept. 24, 1946 |
| 2,468,058 | Grieg | Apr. 26, 1949 |
| 2,484,352 | Miller et al. | Oct. 11, 1949 |
| 2,529,172 | Moe | Nov. 7, 1950 |
| 2,549,776 | Cleeton | Apr. 24, 1951 |